US012812499B2

(12) United States Patent
Karampatsis et al.

(10) Patent No.: US 12,812,499 B2
(45) Date of Patent: Nov. 24, 2026

(54) ENFORCEMENT OF ROUTE SELECTION POLICY RULES IN A WIRELESS COMMUNICATION NETWORK

(71) Applicant: Lenovo (Singapore) Pte. Limited, Singapore (SG)

(72) Inventors: Dimitrios Karampatsis, Ruislip (GB); Apostolis Salkintzis, Glika Nera (GR); Genadi Velev, Darmstadt (DE)

(73) Assignee: Lenovo (Singapore) Pte. Limited, Singapore (SG)

( * ) Notice: Subject to any disclaimer, the term of this patent is extended or adjusted under 35 U.S.C. 154(b) by 229 days.

(21) Appl. No.: 18/849,819

(22) PCT Filed: May 13, 2022

(86) PCT No.: PCT/EP2022/063051
§ 371 (c)(1),
(2) Date: Sep. 23, 2024

(87) PCT Pub. No.: WO2023/179887
PCT Pub. Date: Sep. 28, 2023

(65) Prior Publication Data

US 2025/0203486 A1 Jun. 19, 2025

(30) Foreign Application Priority Data

Mar. 24, 2022 (GR) .............................. 20220100262

(51) Int. Cl.
*H04L 41/0894* (2022.01)
*H04L 41/14* (2022.01)
*H04W 40/12* (2009.01)

(52) U.S. Cl.
CPC ......... *H04W 40/12* (2013.01); *H04L 41/0894* (2022.05); *H04L 41/145* (2013.01)

(58) Field of Classification Search
None
See application file for complete search history.

(56) References Cited

U.S. PATENT DOCUMENTS

2018/0279400 A1* 9/2018 Faccin ................ H04W 68/005
2020/0053828 A1* 2/2020 Bharatia ............... H04W 76/11
(Continued)

FOREIGN PATENT DOCUMENTS

WO 2020064125 A1 4/2020
WO 2021092308 A1 5/2021

OTHER PUBLICATIONS

PCT/EP2022/063051 , "International Search Report and Written Opinion", International Application No. PCT/EP2022/063051, Nov. 24, 2022, 11 pages.

*Primary Examiner* — Nguyen H Ngo
(74) *Attorney, Agent, or Firm* — FIG. 1 Patents

(57) ABSTRACT

A request is received from a first function, identifying a list of allowed traffic to a user plane connection, the request indicating to identify a device that routes traffic via the user plane connection that is not included in the list of allowed traffic. A request to a second function to be notified when the device establishes a user plane connection to network resources defined in a route selection policy rule. A third function is determined with which the device has established a user plane connection. A request is sent to the third function to report, for the device, traffic sent via the user plane connection that is not included in the list of allowed traffic. A report is received from the third function indicating, for the device, the traffic sent via the user plane connection that is not included in the list of allowed traffic.

20 Claims, 5 Drawing Sheets

(56) References Cited

U.S. PATENT DOCUMENTS

2020/0383033 A1 * 12/2020 Foti ........................ H04W 76/16
2026/0039623 A1 * 2/2026 Purkayastha ....... H04L 61/5014

* cited by examiner

ENFORCEMENT OF ROUTE SELECTION POLICY RULES IN A WIRELESS COMMUNICATION NETWORK

FIELD

The subject matter disclosed herein relates generally to the field of implementing enforcement of route selection policy rules in a wireless communication network. This document defines an apparatus in a wireless communication network; a method in an apparatus in a wireless communication network; a third network function; and a method in a third network function.

BACKGROUND

User Equipment (UE) Route Selection Policy (URSP) rules and the procedures for a UE to apply URSP rules are described in 3GPP TS 23.502 v17.3.0 and 3GPP TS 23.503 v17.2.0. The URSP rules contain a Traffic Descriptor that allows the UE to determine if a URSP rule matches application traffic. Traffic Descriptors include Application Descriptors which may define the operating system identity (OSID) and the application identity (OSAppID). Traffic Descriptors also include IP flow descriptors such as the target address of application traffic, a requested Data Network Name by the application, and/or a connection capability requested by an application (e.g. an IMS connection).

S2-2107213 is a 3GPP discussion paper from China Telecom which describes how the PCF can use analytics from the NWDAF. The proposal suggests that the PCF re-use existing NWDAF analytics to determine whether the UE requires updated URSP rules.

3GPP TR 23.700-91 v17.0.0 describes at clause 6.28 a method for the NWDAF to receive information directly from the UE on whether a URSP rule is enforced. Such a procedure requires significant signaling, and further relies on trust in the information provided by the UE.

SUMMARY

Route section policy rules such as URSP rules allow a wireless communication network to appropriately route traffic from wireless communication devices such as UEs in a manner that optimizes use of network resources. However, a wireless communication device may fail to implement a route selection policy rule where it should. Such failure may be due to malicious activity at the wireless communication device. Such a failure may be due to a route selection policy rule failing to capture traffic that it was intended to be applied to.

Disclosed herein are procedures for implementing enforcement of route selection policy rules in a wireless communication network. Said procedures may be implemented by an apparatus in a wireless communication network; a method in an apparatus in a wireless communication network; a third network function; and a method in a third network function.

There is provided herein an apparatus in a wireless communication network, the apparatus comprising a receiver, a transmitter and a processor. The receiver is arranged to receive a first request from a first network function, the first request identifying at least one wireless communication device, and a first list of allowed traffic to a user plane connection with network resources established corresponding to a route selection policy rule, wherein the request includes an indication to identify at least one wireless communication device that routes traffic via the established user plane connection that is not included in the first list of allowed traffic. The transmitter is arranged to send a second request to a second network function to be notified when the at least one wireless communication device establishes a user plane connection to network resources defined in the route selection policy rule. The processor is arranged to determine at least one third network function with which the at least one wireless communication devices have established a user plane connection according to network resources defined in the route selection policy rule. The transmitter is arranged to send a third request to the at least one third network function to report, for each of the at least one wireless communication devices, traffic sent via the user plane connection that is not included in the first list of allowed traffic. The receiver is further arranged to receive from the third network function, a report indicating that for any of the at least one wireless communication devices that route traffic that is not included in the first list of allowed traffic.

There is further provided a method in an apparatus in a wireless communication network. The method comprises receiving a first request from a first network function, the first request identifying at least one wireless communication device, and a first list of allowed traffic to a user plane connection with network resources established corresponding to a route selection policy rule, wherein the request includes an indication to identify at least one wireless communication device that routes traffic via the established user plane connection that is not included in the first list of allowed traffic. The method further comprises sending a second request to a second network function to be notified when the at least one wireless communication device establishes a user plane connection to network resources defined in the route selection policy rule. The method further comprises determining at least one third network function with which the at least one wireless communication devices have established a user plane connection according to network resources defined in the route selection policy rule. The method further comprises sending a third request to the at least one third network function to report, for each of the at least one wireless communication devices, traffic sent via the user plane connection that is not included in the first list of allowed traffic. The method further still comprises receiving from the third network function, a report indicating that for any of the at least one wireless communication devices that route traffic that is not included in the first list of allowed traffic.

There is further provided a third network function comprising a receiver and a transmitter. The receiver is arranged to receive a third request from an apparatus, the request for the third network function to report, for each of at least one wireless communication device, traffic sent via a user plane connection that is not included in a first list of allowed traffic. The transmitter is arranged to send a report to the apparatus, the report indicating that for any of the at least one wireless communication devices, traffic is sent via the user plane connection that is not included in the first list of allowed traffic.

There is further provided a method in a third network function. The method comprises receiving a third request from an apparatus, the request for the third network function to report, for each of at least one wireless communication device, traffic sent via a user plane connection that is not included in a first list of allowed traffic. The method further comprises sending a report to the apparatus, the report indicating that for any of the at least one wireless communication devices, traffic is sent via the user plane connection that is not included in the first list of allowed traffic.

BRIEF DESCRIPTION OF THE DRAWINGS

In order to describe the manner in which advantages and features of the disclosure can be obtained, a description of the disclosure is rendered by reference to certain apparatus and methods which are illustrated in the appended drawings. Each of these drawings depict only certain aspects of the disclosure and are not therefore to be considered to be limiting of its scope. The drawings may have been simplified for clarity and are not necessarily drawn to scale.

Methods and apparatus for implementing enforcement of route selection policy rules in a wireless communication network will now be described, by way of example only, with reference to the accompanying drawings, in which.

DETAILED DESCRIPTION

Figure 1:
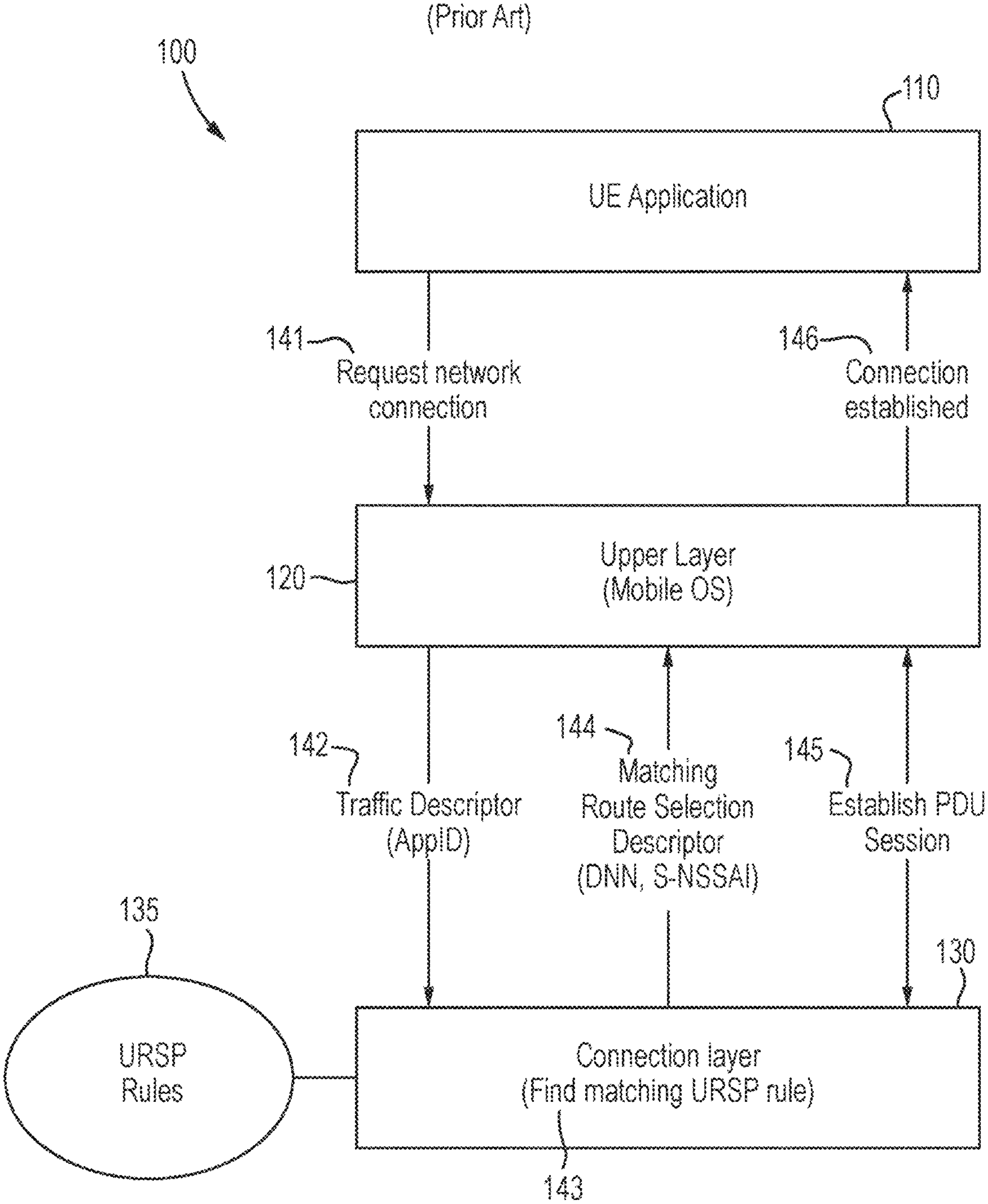
Fig. 1 (Prior Art)
FIG. 1 illustrates a known arrangement whereby a UE routes application traffic via a PDU session that matches Route Selection Descriptor components according to URSP rules.

As will be appreciated by one skilled in the art, aspects of this disclosure may be embodied as a system, apparatus, method, or program product. Accordingly, arrangements described herein may be implemented in an entirely hardware form, an entirely software form (including firmware, resident software, micro-code, etc.) or a form combining software and hardware aspects.

For example, the disclosed methods and apparatus may be implemented as a hardware circuit comprising custom very-large-scale integration ("VLSI") circuits or gate arrays, off-the-shelf semiconductors such as logic chips, transistors, or other discrete components. The disclosed methods and apparatus may also be implemented in programmable hardware devices such as field programmable gate arrays, programmable array logic, programmable logic devices, or the like. As another example, the disclosed methods and apparatus may include one or more physical or logical blocks of executable code which may, for instance, be organized as an object, procedure, or function.

Furthermore, methods and apparatus may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In certain arrangements, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to an example of a particular method or apparatus, or similar language, means that a particular feature, structure, or characteristic described in connection with that example is included in at least one implementation of the method and apparatus described herein. Thus, reference to features of an example of a particular method or apparatus, or similar language, may, but do not necessarily, all refer to the same example, but mean "one or more but not all examples" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics described herein may be combined in any suitable manner. In the following description, numerous specific details are provided, such as examples of programming, software modules, user selections, network transactions, database queries, database structures, hardware modules, hardware circuits, hardware chips, etc., to provide a thorough understanding of the disclosure. One skilled in the relevant art will recognize, however, that the disclosed methods and apparatus may be practiced without one or more of the specific details, or with other methods, components, materials, and so forth. In other instances, well-known structures, materials, or operations are not shown or described in detail to avoid obscuring aspects of the disclosure.

Aspects of the disclosed method and apparatus are described below with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures.

Since Release 15 onwards URSP rules have been defined to allow a wireless communication device such as a UE to determine how to route application traffic via a wireless communication network. The wireless communication network may comprise a 3GPP access or non-3GPP access via an untrusted or trusted WLAN access. Alternatively, the UE may route application traffic non-seamlessly bypassing the wireless communication network via a WLAN connection. The URSP rules and the procedures for the UE to apply URSP rules are described in 3GPP TS 23.502 v17.3.0 and 3GPP TS 23.503 v17.3.0 (URSP rules definitions and procedures are included from version 15.0.0 onwards of 23.502 and 23.503).

The URSP rules contain a Traffic Descriptor that allows the UE to determine if a URSP rule matches application traffic. Traffic Descriptors include: Application Descriptors (OSID/OSAppID), IP flow descriptors (e.g. target address of application traffic, a requested DNN by the application or a connection capability requested by an application (e.g. an IMS connection).

Each URSP rule contains a Route Selection Descriptor (RSD) that describes to the UE how the UE is to route a PDU session that is established for application traffic matching the Traffic Descriptors for that URSP rule. The RSD includes one or more of the following: SSC Mode Selection, Network Slice Selection, DNN Selection, PDU Session Type Selection, Non-Seamless Offload indication, Access Type preference.

The UE routes the application traffic via the PDU session that matches the RSD components according to the relevant URSP rule and via 3GPP or non-3GPP access.

FIG. 1 illustrates a known arrangement whereby a UE routes application traffic via a PDU session that matches Route Selection Descriptor components according to URSP rules. FIG. 1 illustrates a UE application 110, an operating system 120, and a connection layer 130 of a UE 100. The UE 100 may be a user equipment apparatus 200 or a UE 610 as described herein. The apparatus communicates with a wireless communications network. In operation, the Connection layer 130 accesses URSP rules 135.

The operation of the arrangement of FIG. 1 will now be described. At 141, the UE application 110 requests a network connection from the operating system 120 of the apparatus. At 142, the operating system 120 sends a Traffic Descriptor, such as the application identity, to the Connection layer 130. In response thereto, at 143, the Connection layer 130 identifies a URSP rule from a set of available URSP rules 135 stored in the UE and that matches the received Traffic Descriptor. From the identified URSP rule the connection layer 130 determines a Route Selection Descriptor. Subsequently, at 144, the connection layer 130 sends, to the operating system 120, the determined Route Selection Descriptor. At 145, the operating system 120 initiates the establishing of a PDU session according to the Route Selection Descriptor. At 146, when the PDU session is established, the operating system 120 reports, to the UE application 110, that the connection is established.

FIG. 1 merely shows an example implementation within a UE. In practice the exact mechanism for applying routing rules to application traffic is an implementation detail. For example, routing rules can be pre-assigned by the apparatus to every installed application, ready to be recalled and implemented when an application requests a connection. Alternatively, the apparatus may only assign a routing rule to an application when that application requests a connection. The routing rules are stored in the UE and can be updated by the network.

This document presents a mechanism by which the 5G Core (5GC) can identify whether or when the UE enforces a URSP rule to route an application traffic to a PDU Session based on a URSP rule provisioned by 5GC. Further, this document defines actions that the 5G System (5GS) can take after the 5GC identifies that a UE has not applied a a URSP rule for specific application traffic when it should have done.

The solutions presented herein tend to address how a consumer, such as a PCF can determine which UEs do not enforce the provisioned URSP rules correctly by leveraging analytics provided by the Network Automation and Data Analytics. Network Data Analytics Function (NWDAF).

Figure 2:
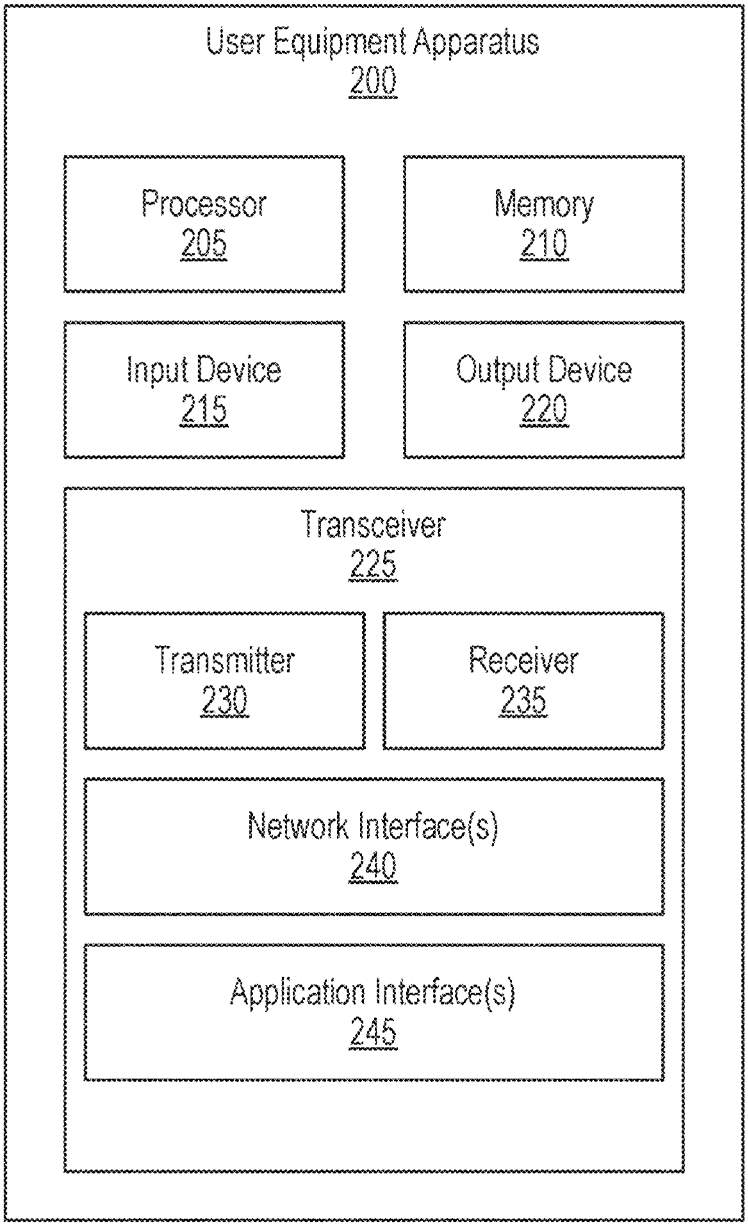
FIG. 2 depicts a user equipment apparatus.

FIG. 2 depicts a user equipment apparatus 200 that may be used for implementing the methods described herein. The user equipment apparatus 200 is used to implement one or more of the solutions described above. The user equipment apparatus 200 may be a UE 100 or a UE 610 as described herein. The user equipment apparatus 200 includes a processor 205, a memory 210, an input device 215, an output device 220, and a transceiver 225.

The input device 215 and the output device 220 may be combined into a single device, such as a touchscreen. In some implementations, the user equipment apparatus 200 does not include any input device 215 and/or output device 220. The user equipment apparatus 200 may include one or more of: the processor 205, the memory 210, and the transceiver 225, and may not include the input device 215 and/or the output device 220.

As depicted, the transceiver 225 includes at least one transmitter 230 and at least one receiver 235. The transceiver 225 may communicate with one or more cells (or wireless coverage areas) supported by one or more base units. The transceiver 225 may be operable on unlicensed spectrum. Moreover, the transceiver 225 may include multiple UE panels supporting one or more beams. Additionally, the transceiver 225 may support at least one network interface 240 and/or application interface 245. The application interface(s) 245 may support one or more APIs. The network interface(s) 240 may support 3GPP reference points, such as Uu, N1, PC5, etc. Other network interfaces 240 may be supported, as understood by one of ordinary skill in the art.

The processor 205 may include any known controller capable of executing computer-readable instructions and/or capable of performing logical operations. For example, the processor 205 may be a microcontroller, a microprocessor, a central processing unit ("CPU"), a graphics processing unit ("GPU"), an auxiliary processing unit, a field programmable gate array ("FPGA"), or similar programmable controller. The processor 205 may execute instructions stored in the memory 210 to perform the methods and routines described herein. The processor 205 is communicatively coupled to the memory 210, the input device 215, the output device 220, and the transceiver 225.

The processor 205 may control the user equipment apparatus 200 to implement the above-described UE behaviors. The processor 205 may include an application processor (also known as "main processor") which manages application-domain and operating system ("OS") functions and a baseband processor (also known as "baseband radio processor") which manages radio functions.

The memory 210 may be a computer readable storage medium. The memory 210 may include volatile computer storage media. For example, the memory 210 may include a RAM, including dynamic RAM ("DRAM"), synchronous dynamic RAM ("SDRAM"), and/or static RAM ("SRAM"). The memory 210 may include non-volatile computer storage media. For example, the memory 210 may include a hard disk drive, a flash memory, or any other suitable non-volatile computer storage device. The memory 210 may include both volatile and non-volatile computer storage media.

The memory 210 may store data related to implement a traffic category field as describe above. The memory 210 may also store program code and related data, such as an operating system or other controller algorithms operating on the apparatus 200.

The input device 215 may include any known computer input device including a touch panel, a button, a keyboard, a stylus, a microphone, or the like. The input device 215 may be integrated with the output device 220, for example, as a touchscreen or similar touch-sensitive display. The input device 215 may include a touchscreen such that text may be input using a virtual keyboard displayed on the touchscreen and/or by handwriting on the touchscreen. The input device 215 may include two or more different devices, such as a keyboard and a touch panel.

The output device 220 may be designed to output visual, audible, and/or haptic signals. The output device 220 may include an electronically controllable display or display device capable of outputting visual data to a user. For example, the output device 220 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 220 may include a wearable display separate from, but communicatively coupled to, the rest of the user equipment apparatus 200, such as a smart watch, smart glasses, a heads-up display, or the like. Further, the output device 220 may be a component of a smart phone, a personal digital assistant, a television, a table computer, a notebook (laptop) computer, a personal computer, a vehicle dashboard, or the like.

The output device 220 may include one or more speakers for producing sound. For example, the output device 220 may produce an audible alert or notification (e.g., a beep or chime). The output device 220 may include one or more haptic devices for producing vibrations, motion, or other haptic feedback. All, or portions, of the output device 220 may be integrated with the input device 215. For example, the input device 215 and output device 220 may form a touchscreen or similar touch-sensitive display. The output device 220 may be located near the input device 215.

The transceiver 225 communicates with one or more network functions of a mobile communication network via one or more access networks. The transceiver 225 operates under the control of the processor 205 to transmit messages, data, and other signals and also to receive messages, data, and other signals. For example, the processor 205 may selectively activate the transceiver 225 (or portions thereof) at particular times in order to send and receive messages.

The transceiver 225 includes at least one transmitter 230 and at least one receiver 235. The one or more transmitters 230 may be used to provide UL communication signals to a base unit of a wireless communications network. Similarly, the one or more receivers 235 may be used to receive DL communication signals from the base unit. Although only one transmitter 230 and one receiver 235 are illustrated, the user equipment apparatus 200 may have any suitable number of transmitters 230 and receivers 235. Further, the transmitter(s) 230 and the receiver(s) 235 may be any suitable type of transmitters and receivers. The transceiver 225 may include a first transmitter/receiver pair used to communicate with a mobile communication network over licensed radio spectrum and a second transmitter/receiver pair used to communicate with a mobile communication network over unlicensed radio spectrum.

The first transmitter/receiver pair may be used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. The first transmitter/receiver pair and the second transmitter/receiver pair may share one or more hardware components. For example, certain transceivers 225, transmitters 230, and receivers 235 may be implemented as physically separate components that access a shared hardware resource and/or software resource, such as for example, the network interface 240.

One or more transmitters 230 and/or one or more receivers 235 may be implemented and/or integrated into a single hardware component, such as a multi-transceiver chip, a system-on-a-chip, an Application-Specific Integrated Circuit ("ASIC"), or other type of hardware component. One or more transmitters 230 and/or one or more receivers 235 may be implemented and/or integrated into a multi-chip module. Other components such as the network interface 240 or other hardware components/circuits may be integrated with any number of transmitters 230 and/or receivers 235 into a single chip. The transmitters 230 and receivers 235 may be logically configured as a transceiver 225 that uses one more common control signals or as modular transmitters 230 and receivers 235 implemented in the same hardware chip or in a multi-chip module.

Figure 3:
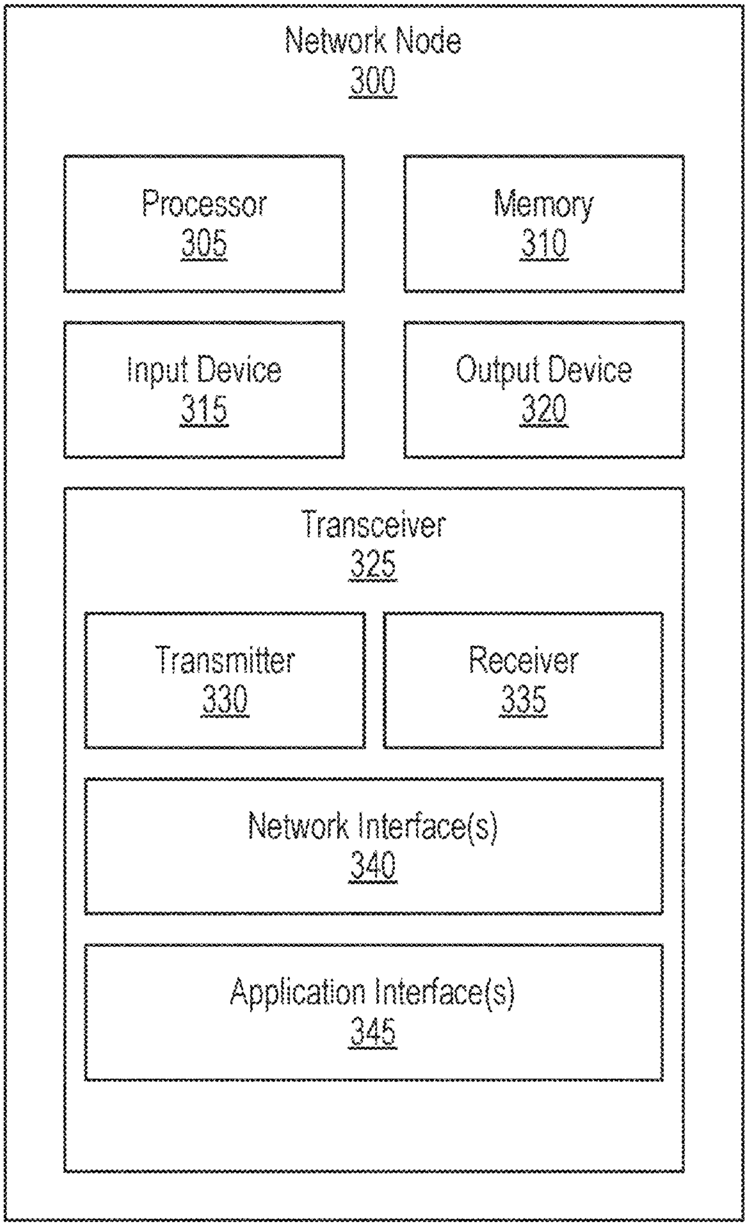
FIG. 3 depicts further details of the network node.

FIG. 3 depicts further details of the network node 300 that may be used for implementing the methods described herein. The network node 300 may be one implementation of an entity in the wireless communications network. Network node 300 may be a network function. Network node 300 may comprise a PCF 620, an NWDAF 630, an SMF 640, or a UPF 650 as described herein. The network node 300 includes a processor 305, a memory 310, an input device 315, an output device 320, and a transceiver 325.

The input device 315 and the output device 320 may be combined into a single device, such as a touchscreen. In some implementations, the network node 300 does not include any input device 315 and/or output device 320. The network node 300 may include one or more of: the processor 305, the memory 310, and the transceiver 325, and may not include the input device 315 and/or the output device 320.

As depicted, the transceiver 325 includes at least one transmitter 330 and at least one receiver 335. Here, the transceiver 325 communicates with one or more remote units 200. Additionally, the transceiver 325 may support at least one network interface 340 and/or application interface 345. The application interface(s) 345 may support one or more APIs. The network interface(s) 340 may support 3GPP reference points, such as Uu, N1, N2 and N3. Other network interfaces 340 may be supported, as understood by one of ordinary skill in the art.

The processor 305 may include any known controller capable of executing computer-readable instructions and/or capable of performing logical operations. For example, the processor 305 may be a microcontroller, a microprocessor, a CPU, a GPU, an auxiliary processing unit, a FPGA, or similar programmable controller. The processor 305 may execute instructions stored in the memory 310 to perform the methods and routines described herein. The processor 305 is communicatively coupled to the memory 310, the input device 315, the output device 320, and the transceiver 325.

The memory 310 may be a computer readable storage medium. The memory 310 may include volatile computer storage media. For example, the memory 310 may include a RAM, including dynamic RAM ("DRAM"), synchronous dynamic RAM ("SDRAM"), and/or static RAM ("SRAM"). The memory 310 may include non-volatile computer storage media. For example, the memory 310 may include a hard disk drive, a flash memory, or any other suitable non-volatile computer storage device. The memory 310 may include both volatile and non-volatile computer storage media.

The memory 310 may store data related to establishing a multipath unicast link and/or mobile operation. For example, the memory 310 may store parameters, configurations, resource assignments, policies, and the like, as described above. The memory 310 may also stores program code and related data, such as an operating system or other controller algorithms operating on the network node 300.

The input device 315 may include any known computer input device including a touch panel, a button, a keyboard, a stylus, a microphone, or the like. The input device 315 may be integrated with the output device 320, for example, as a touchscreen or similar touch-sensitive display. The input device 315 may include a touchscreen such that text may be input using a virtual keyboard displayed on the touchscreen and/or by handwriting on the touchscreen. The input device 315 may include two or more different devices, such as a keyboard and a touch panel.

The output device 320 may be designed to output visual, audible, and/or haptic signals. The output device 320 may include an electronically controllable display or display device capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display separate from, but communicatively coupled to, the rest of the network node 300, such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

The output device 320 may include one or more speakers for producing sound. For example, the output device 320 may produce an audible alert or notification (e.g., a beep or chime). The output device 320 may include one or more haptic devices for producing vibrations, motion, or other haptic feedback. All, or portions, of the output device 320 may be integrated with the input device 315. For example, the input device 315 and output device 320 may form a touchscreen or similar touch-sensitive display. The output device 320 may be located near the input device 315.

The transceiver 325 includes at least one transmitter 330 and at least one receiver 335. The one or more transmitters 330 may be used to communicate with the UE, as described herein. Similarly, the one or more receivers 335 may be used to communicate with network functions in the PLMN and/or RAN, as described herein. Although only one transmitter 330 and one receiver 335 are illustrated, the network node 300 may have any suitable number of transmitters 330 and receivers 335. Further, the transmitter(s) 330 and the receiver(s) 335 may be any suitable type of transmitters and receivers.

There is provided an apparatus in a wireless communication network, the apparatus comprising a receiver, a transmitter and a processor. The receiver is arranged to receive a first request from a first network function, the first request identifying at least one wireless communication device, and a first list of allowed traffic to a user plane connection with network resources established corresponding to a route selection policy rule, wherein the request includes an indication to identify at least one wireless communication device that routes traffic via the established user plane connection that is not included in the first list of allowed traffic. The transmitter is arranged to send a second request to a second network function to be notified when the at least one wireless communication device establishes a user plane connection to network resources defined in the route selection policy rule. The processor is arranged to determine at least one third network function with which the at least one wireless communication devices have established a user plane connection according to network resources defined in the route selection policy rule. The transmitter is arranged to send a third request to the at least one third network function to report, for each of the at least one wireless communication devices, traffic sent via the user plane connection that is not included in the first list of allowed traffic. The receiver is further arranged to receive from the third network function, a report indicating that for any of the at least one wireless communication devices that route traffic that is not included in the first list of allowed traffic.

The apparatus may be a Network Data Analytics Function (NWDAF). The first network function may be a Policy Control Function (PCF). The second network function may be a Session Management Function (SMF), a User Data Management (UDM) or a Network Function (NF) Repository Function (NRF). The third network function may be a User Plane Function (UPF). The network resources may comprise a network slice and/or a data network. The network slice may be identified by a single Network Slice Selection Assistance Information (S-NSSAI). The data network may be identified by a data network name (DNN).

The apparatus described herein tends to provide communication with a third network function to facilitate enforcement of route selection policy rules. Such operation may be implemented with an interface provided between the apparatus and the third network function.

The report indicating that for any of the at least one wireless communication devices, traffic is sent via the user plane connection using network resources outside of those defined in the route selection policy rule may comprise a list of wireless communication devices for which traffic is sent via the user plane connection using network resources outside of those defined in the route selection policy.

The apparatus may be a NF, the second network function may be an SMF and the third network function may be a UPF. In such an arrangement, the SMF interfaces with the UPF and the SMF provides route selection policy rules to the UPF according to policies received from the PCF. The NF finds the SMF serving a UE and then queries the SMF to finds the UPF. The NF may find the SMF serving a UE by querying a UDM. The NF may be a NWDAF.

The apparatus may be a NWDAF, the second network function may be a UDM, and the third network function may be a UPF. Where an interface is provided between the NWDAF and UPF then the NWDAF can query directly the UDM to be notified of a serving UPF. In such a case there is no need to obtain serving SMF information.

The apparatus may be a NWDAF, the first network function may be a consumer, the second network function may be an NRF, and the third network function may be a UPF. When the first request is includes any UE for a particular route selection policy rule, then the NWDAF queries the NRF to find all Network Functions that support the network resources defined in the route selection policy rule, and further the NWDAF subscribe to each NF to be notified when a UE establishes a data connection according to the route selection policy rule.

The first request may include the traffic descriptor of the route selection policy rule. The first request may identify the at least one wireless communication device as any wireless communication device that establishes a data session according to the route selection policy rule.

Figure 4:
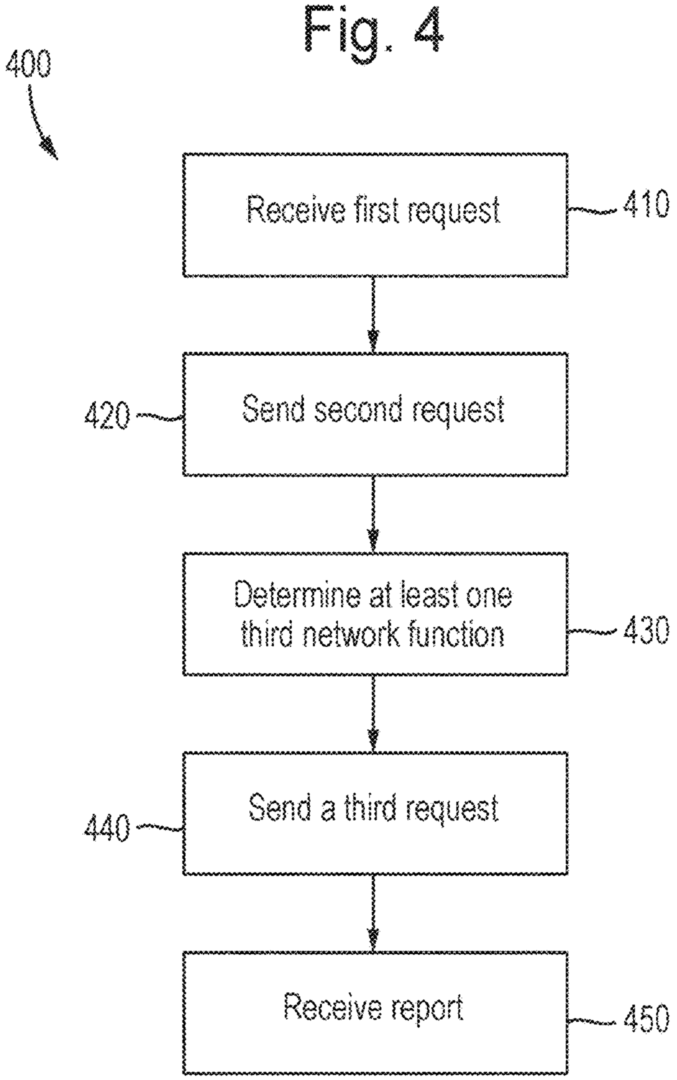
FIG. 4 illustrates a method 400 in an apparatus in a wireless communication network.

FIG. 4 illustrates a method 400 in an apparatus in a wireless communication network. The method 400 comprises receiving 410 a first request from a first network function, the first request identifying at least one wireless communication device, and a first list of allowed traffic to a user plane connection with network resources established corresponding to a route selection policy rule, wherein the request includes an indication to identify at least one wireless communication device that routes traffic via the established user plane connection that is not included in the first list of allowed traffic. The method 400 further comprises sending 420 a second request to a second network function to be notified when the at least one wireless communication device establishes a user plane connection to network resources defined in the route selection policy rule. The method 400 further comprises determining 430 at least one third network function with which the at least one wireless communication devices have established a user plane connection according to network resources defined in the route selection policy rule. The method 400 further comprises sending 440 a third request to the at least one third network function to report, for each of the at least one wireless communication devices, traffic sent via the user plane connection that is not included in the first list of allowed traffic. The method 400 further still comprises receiving 450 from the third network function, a report indicating that for any of the at least one wireless communication devices that route traffic that is not included in the first list of allowed traffic.

The first request may include the traffic descriptor of the route selection policy rule.

The first request may identify the at least one wireless communication device as any wireless communication device that establishes a data session according to the route selection policy rule.

There is further provided a third network function comprising a receiver and a transmitter. The receiver is arranged to receive a third request from an apparatus, the request for the third network function to report, for each of at least one wireless communication device, traffic sent via a user plane connection that is not included in a first list of allowed traffic. The transmitter is arranged to send a report to the apparatus, the report indicating that for any of the at least one wireless communication devices, traffic is sent via the user plane connection that is not included in the first list of allowed traffic.

The apparatus may be a NF and the third network function may be a UPF. In such an arrangement, the SMF interfaces with the UPF and the SMF provides route selection policy rules to the UPF according to policies received from the PCF. The NF finds the SMF serving a UE and then queries the SMF to finds the UPF. The NF may find the SMF serving a UE by querying a UDM. The NF may be a NWDAF.

The apparatus may be an NWDAF and the third network function may be a UPF. Where an interface is provided between the NWDAF and UPF then the NWDAF can query directly the UDM to be notified of a serving UPF. In such a case there is no need to obtain serving SMF information.

Alternatively, when the first request is includes any UE for a particular route selection policy rule, then the NWDAF queries the NRF to find all Network Functions that support the network resources defined in the route selection policy rule, and further the NWDAF subscribe to each NF to be notified when a UE establishes a data connection according to the route selection policy rule.

The third request may include the traffic descriptor of the route selection policy rule.

The route selection policy rule may define a type of traffic, and a set of service data flows, that are allowed in respect of the type of traffic.

Figure 5:
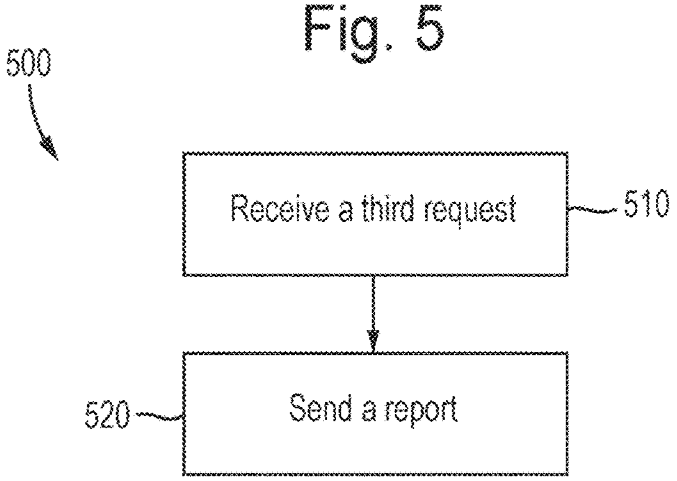
FIG. 5 illustrates a method 500 in a third network function.

FIG. 5 illustrates a method 500 in a third network function. The method 500 comprises receiving 510 a third request from an apparatus, the request for the third network function to report, for each of at least one wireless communication device, traffic sent via a user plane connection that is not included in a first list of allowed traffic. The method 500 further comprises sending 520 a report to the apparatus, the report indicating that for any of the at least one wireless communication devices, traffic is sent via the user plane connection that is not included in the first list of allowed traffic.

When the consumer, such as a PCF or SMF, needs to identify if there are UEs that do not enforce the provisioned URSP rules correctly, the consumer sends a request to the NWDAF to identify UEs that do not enforce URSP rules correctly. An example of a UE not applying a USRP rule correctly is for it to route application traffic to an incorrect network slice or data network in the wireless communication network. A network slice may be identified by a Network Slice Selection Assistance Information (S-NSSAI). A data network may be identified by a Data Network Name (DNN). For simplicity, a wireless communication device that fails to properly apply a route selection policy rule will be referred to herein as "misbehaving UEs". Consumer of such analytics may be the PCF or the SMF.

By inspecting the relevant URSP rule, the PCF can determine the correct application traffic that needs to be routed over a specific S-NSSAI/DNN. The PCF (or other consumer) may then determined if the rule is enforced correctly by at least one UE. A Traffic Descriptor of the URSP rule identifies the application traffic and the Route Selection Descriptor component, and will denote the correct S-NSSAI/DNN to route the application traffic.

The consumer (PCF or SMF) requests analytics to identify "misbehaving UEs" based on local configuration. The request is sent from the consumer to an NWDAF.

The request sent to the NWDAF to provide analytics to detect UEs that do not enforce URSP correctly may include An analytic ID denoting a request for URSP enforcement analytics, and at least one Analytic Filter.

The Analytic Filters may comprise

The S-NSSAI/DNN of the PDU session established by a UE;

The Allowed application traffic;

Alternatively the Rule ID of a URSP rule;

Area of interest; and/or

Any UE or list of UEs.

The Allowed application traffic towards the PDU session is defined according to the URSP rule. Allowed application traffic may include the Traffic Descriptor of the URSP rule (e.g. Application ID, FQDN) or may include allowed service data flows. For example, the consumer may determine the allowed service data flows based on the Traffic Descriptor.

In an alternative the consumer may subscribe to the NWDAF to report if URSP rules are enforced only when a UE establishes a PDU session due to a trigger from a URSP rule. The analytics filters in the analytics request include an optional indication to determine URSP rule enforcement only for PDU sessions that were established by UEs due to a particular URSP rule. In such arrangements the network is aware if a PDU session is established due to a URSP rule by the UE including an indication within the PDU establishment request that the this PDU session is being requested pursuant to a matched URSP rule. The indication in the PDU establishment request may include a URSP rule identifier or a Policy Section Identifier where the URSP rule that triggered the UE to establish a PDU session is stored.

The NWDAF receives an analytics request from a consumer network function (NF), such as a PCF or SMF, the request for a report of UEs that do not enforce one or more URSP rules correctly. In response to such an analytics request, the NWDAF identifies "misbehaving UEs" by requesting a UPF to identify traffic using a specific S-NSSAI/DNN that does not match the allowed traffic defined by the URSP rule. Such traffic is referred to herein as "non-matching traffic". To achieve this, the NWDAF first determines the UPF(s) where traffic must be inspected for the one or more UE(s) based on the S-NSSAI/DNN received in the analytics request. The NWDAF determines the UPF(s) that support the requested S-NSSAI/DNN either: by interfacing with the NRF; by interfacing with the UDM (if the request includes a list of one or more UE); via the SMF by querying the NRF; or via the SMF by querying the UDM.

If the consumer includes in the analytics request an optional indication of PDU session establishment due to URSP rule, then when the NWDAF determines UPFs that will identify traffic by retrieving from the SMF the PDU sessions that were triggered due to a URSP rule and the corresponding UPFs allocated for the PDU session.

The NWDAF then subscribes to the UPF to report "non-matching traffic". In the subscription request to the UPF, the NWDAF includes a specific Event ID indicating to report non-matching traffic, the network resources allowed (defined by S-NSSAI and/or DNN), and a list of at least one UE ID. The UE ID may be a Subscription Permanent Identifier (SUPI). Alternatively, the NWDAF may include, instead of a UE ID, the UE IP address of at least one UE. In such an arrangement, the NWDAF may retrieve the UE IP address allocated to a PDU session requested by a UE from the SMF.

The NWDAF may also include in the subscription to the UPF a definition of the Allowed Traffic for the S-NSSAI/DNN. This allows the UPF to determine when to report non-matching traffic. The definition of Allowed Traffic may contain the Traffic Descriptor of the URSP rule or may include service data flow information. Service data flow information may e included if the consumer has derived the allowed traffic filters based on the Traffic Descriptor of the URSP rule. Examples of the information included by the NWDAF in the subscription request to the UPF are shown below:

Traffic Filters/Uplink: Source Address: UE IP address (of the UE where traffic is inspected), Destination Address: Any Traffic Filters/Downlink: Source Address: Any: Destination Address: UE IP address (of the UE where traffic is inspected).

Traffic Filters/Exception: 5-tuple/application ID of the Applications that are intended to be routed via the specific S-NSSAI/DNN.

If the consumer includes in the analytic request a rule ID of the URSP rule then the NWDAF retrieves the URSP rule from the UDR and determines the Allowed Traffic from the Traffic Descriptor of the URSP rule.

When the UPF detects non-matching traffic the UPF reports this to the NWDAF, together with traffic filters indicating the traffic detected and a UE identifier (UE ID or UE IP address) of the UE detected to route such non-matching traffic via the particular S-NSSAI/DNN.

The NWDAF is then able to derive analytics and reports to the consumer a list of UEs that route traffic incorrectly. If the consumer is the PCF the PCF may construct new URSP rules for such UEs to route the traffic via a different S-NSSAI/DNN. Such new URSP rules may attempt to correct the behavior of the "misbehaving UEs".

Figure 6:
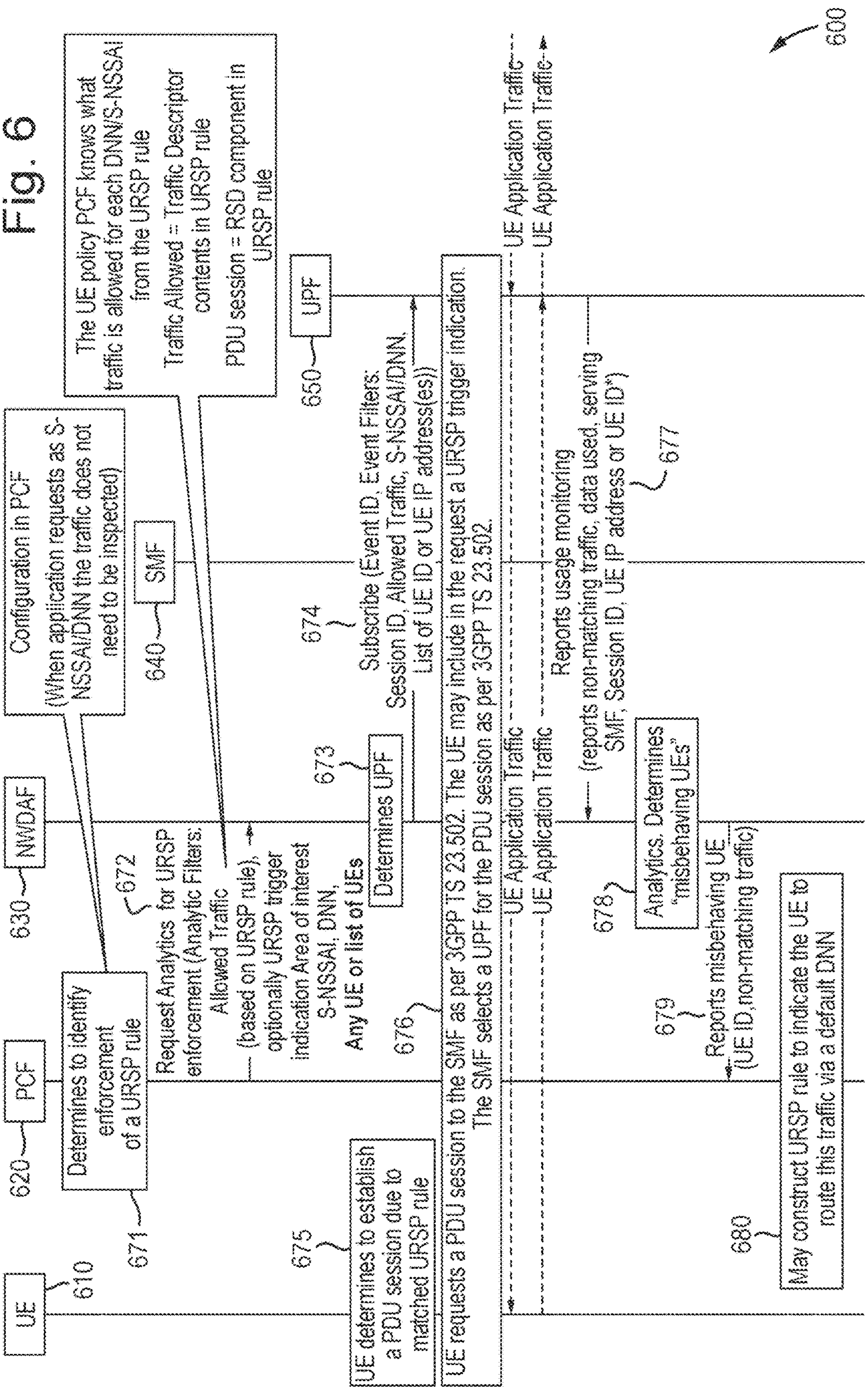
FIG. 6 is a messaging diagram illustrating an arrangement as described herein.

FIG. 6 is a messaging diagram illustrating an arrangement as described herein. FIG. 6 illustrates a system 600 comprising a UE 610, a PCF 620, an NWDAF 630, an SMF 640, and a UPF 650. The UE 610 may be a UE 100 or a user equipment apparatus 200 as described herein. Any of PCF 620, NWDAF 630, SMF 640, and UPF 650 may be implemented by way of a network node 300.

At 671, the consumer (e.g. PCF 620) needs to identify if a URSP rule is enforced correctly by UEs.

At 672, the consumer request analytics for URSP enforcement by the NWDAF 630. The consumer includes a specific Analytic ID (that is associated to the URSP enforcement analytics) and includes as analytics filters: An analytic ID denoting a request for URSP enforcement analytics; and/or Analytic Filters. The Analytics Filters may comprise:

- The S-NSSAI/DNN of the PDU session established by a UE;
- The Allowed application traffic;
- A URSP rule identifier;
- Area of interest;
- Any UE or list of UEs; and/or
- An indication to determine URSP rule enforcement only for PDU session that were established by UEs due to a URSP rule.

The Allowed application traffic towards the PDU session is defined according to the URSP rule. Allowed application traffic may include the Traffic Descriptor of the URSP rule (e.g. Application ID, FQDN) or may include allowed service data flows. For example, the consumer may determine the allowed service data flows based on the Traffic Descriptor.

A 673, if f the request includes Any UE, then the NWDAF 630 subscribes to all SMFs supporting the S-NSSAI/DNN requested, to be notified when a UE establishes a PDU session to the S-NSSAI/DNN requested in step 672. The SMF 640 provides the UE ID and UE IP address to the NWDAF 630.

However, if the request includes a list of at least one specific UE, then the NWDAF 630 finds the UPF 650 serving the at least one specific UE for the requested S-NSSAI/DNN by querying the UDM to identify at least one SMF serving the listed at least one UE for the S-NSSAI/DNN and then querying the at least one SMF to identify the at least one UPF 650 serving the at least one UE 610.

Alternatively, the NWDAF 630 may query the UDM to find the UPF 650 serving the UE for an S-NSSAI/DNN.

At 674, the NWDAF 630 subscribes to the UPF 650 via a direct interface to report "non-matching traffic" via the specific S-NSSAI/DNN. To support such procedure the NWDAF 630 requests the UPF 650 report any traffic except the allowed traffic as indicated by the consumer in step 672. The request includes the S-NSSAI/DNN as in step 671 and list of UE IDs if a list of UE IDs was included in the consumer analytics subscription request and the indicated Allowed Traffic. The Allowed Traffic may be identified by the Traffic Descriptor of the URSP rule or service data flow information as provided by the consumer in step 672. If the consumer request includes a URSP rule identifier, then the NWDAF 630 retrieves the URSP rule by querying the UDR and determines the allowed traffic based on the traffic descriptor of the URSP rule.

Instead of UE IDs the NWDAF 630 may provide a list of UE IP addresses of the UEs established a PDU session to a specific S-NSSAI/DNN. The NWDAF 630 may then obtain the IP address allocated to the UE for the PDU session established to an S-NSSAI/DNN from the SMF 640.

The NWDAF 630 maintains a mapping of the UE ID to the UE IP address allocated to the UE for the PDU session established to the requested S-NSSAI/DNN.

In an alternative, if the consumer included the indication to determine URSP rule enforcement only for PDU sessions that were established by the UE 610 due to a URSP rule, the NWDAF 630 may determine from the SMF 640 the PDU sessions triggered by URSP rules (based on an indication by the UE 610) and request the UPF 650 monitor traffic using the UE ID or UE IP address of the PDU session.

At 675, the UE 610 determines to request a PDU session based on application traffic matching a URSP rule.

At 676, the UE requests establishment of a PDU session to the SMF 640 as per 3GPP TS 23.502 v 17.3.0. Optionally, the UE may include an indication that the request is triggered in accordance with a matched URSP rule.

At 677, when the UPF 650 receives traffic (either in downlink or uplink) for a UE the UPF 650 reports non-matching traffic and includes the service data flows of the traffic detected.

At 678, the NWDAF 630 compiles a list of UEs where application traffic is sent to the wrong slice.

At 679, the NWDAF 630 provides a list of UE IDs and a list of non-matching traffic that is wrongly sent to this S-NSSAI/DNN At 680, the PCF 620 may construct a new URSP rule to route traffic detected via a different S-NSSAI/DNN, e.g. via a default DNN.

In an alternative embodiment instead of the NWDAF 630 subscribing directly to the UPF 650 to retrieve non-matching traffic (as in step 674), the NWDAF 630 subscribes to the SMF 640 serving the UE for a PDU session established to an S-NSSAI/DNN included in the analytics consumer request. The SMF 640 will then subscribe to the UPF 650 allocated for the PDU session to report non-matching traffic. The NWDAF 630 subscribes to each SMF when the SMF 640 notifies the NWDAF 630 that a UE has established a PDU session to an S-NSSAI/DNN included in the consumer analytics request (optionally including a URSP rule indication). The NWDAF 630 receives non-matching traffic detected by the UPF 650 either via the SMF or directly from the UPF 650 if the SMF 640 has configured the UPF 650 to report non-matching traffic directly to the NWDAF 630.

The inventors have considered whether and how the 5GC can be made aware whether or when the UE enforces a URSP rule to route an application traffic to a PDU Session based on the URSP rule provisioned by 5GC. Further, they have considered whether there are any actions the 5GS can take after 5GC is aware whether the UE enforces a URSP rule for specific application traffic or not. If any, what action 5GC should take?

The arrangements described herein leverage the NWDAF to determine UEs that route traffic not intended to a specific S-NSSAI/DNN. The NWDAF retrieves required information from the UPF by requesting the UPF to report traffic of UEs that route traffic not intended to be routed via the specific S-NSSAI/DNN. The NWDAF compiles a list of the one or more UEs that route traffic incorrectly and reports this to the PCF. The PCF may then construct an updated URSP rule for such one or more UEs to route traffic non intended to a DNN/S-NSSAI via a different DNN/S-NSSAI.

Accordingly, an NWDAF may interface directly with UPF via a new service interface to obtain information on traffic not intended to a specific S-NSSAI/DNN. Alternatively, the NWDAF may interface with UPF via SMF to obtain information on traffic not intended to a specific S-NSSAI/DNN.

There is further provided an NWDAF in a first mobile communication network, the NWDAF arranged to: receive a first request from a first network function [Policy Control Function] to identify UEs that do not route application traffic according to a provisioned URSP rule when the UE establish a PDU session to a first S-NSSAI and/or DNN wherein the request includes the allowed traffic to the first S-NSSAI/DNN; send a request to [a list of] second network function [SMF] to be notified when UE establish a user plane connection [PDU session] to the first S-NSSAI and/or DNN; determine a first list of third Network Function [UPF] in response to receiving a list of devices from the second network function that have established a user plane connection to the first S-NSSAI and/or DNN; send a third request to the first list of third network function wherein the request includes a subscription to report non-matching traffic to the allowed traffic to the first S-NSSAI/DNN; and determine a list of UEs that enforce URSP rules incorrectly in response to receiving information from the first list of third network function wherein the information include, a first list of UE identifier and corresponding traffic filter information of non-matching traffic.

The first request may include the traffic descriptor of the URSP rule as allowed traffic.

The first request may include an indication to identify UEs when the UE establish a PDU session due to a URSP rule.

The third request may include an identifier of the UE (or UE IP address) and allowed traffic information indicating the conditions for the UPF to report non-matching traffic.

The third request may include the traffic descriptor of a URSP rule as allowed traffic.

It should be noted that the above-mentioned methods and apparatus illustrate rather than limit the invention, and that those skilled in the art will be able to design many alternative arrangements without departing from the scope of the appended claims. The word “comprising” does not exclude the presence of elements or steps other than those listed in a claim, “a” or “an” does not exclude a plurality, and a single processor or other unit may fulfil the functions of several units recited in the claims. Any reference signs in the claims shall not be construed so as to limit their scope.

Further, while examples have been given in the context of particular communications standards, these examples are not intended to be the limit of the communications standards to which the disclosed method and apparatus may be applied. For example, while specific examples have been given in the context of 3GPP, the principles disclosed herein can also be applied to another wireless communications system, and indeed any communications system which uses routing rules.

The method may also be embodied in a set of instructions, stored on a computer readable medium, which when loaded into a computer processor, Digital Signal Processor (DSP) or similar, causes the processor to carry out the hereinbefore described methods.

The described methods and apparatus may be practiced in other specific forms. The described methods and apparatus are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for wireless communication, the apparatus comprising:
- at least one memory; and
- at least one processor coupled with the at least one memory and configured to cause the apparatus to:
  - receive a first request from a first network function, the first request identifying at least one wireless communication device, and a first list of allowed traffic to a user plane connection with network resources established corresponding to a route selection policy rule, wherein the request includes an indication to identify at least one wireless communication device that routes traffic via the established user plane connection that is not included in the first list of allowed traffic;
  - send a second request to a second network function to be notified when the at least one wireless communication device establishes a user plane connection to network resources defined in the route selection policy rule;
  - determine at least one third network function with which the at least one wireless communication device has established a user plane connection according to network resources defined in the route selection policy rule;
  - send a third request to the at least one third network function to report, for each of the at least one wireless communication devices, traffic sent via the user plane connection that is not included in the first list of allowed traffic;
  - receive from the third network function, a report indicating, for any of the at least one wireless communication device that route traffic that is not included in the first list of allowed traffic, the traffic sent via the user plane connection that is not included in the first list of allowed traffic.

2. The apparatus of claim 1, wherein the apparatus implements a network function (NF), the second network function is a session management function (SMF) and the third network function is a user plane function (UPF).

3. The apparatus of claim 1, wherein the apparatus implements a network data analytics function (NWDAF), the second network function is a user data management (UDM), and the third network function is a user plane function (UPF).

4. The apparatus of claim 1, wherein the apparatus implements a network data analytics function (NWDAF), the first network function is a consumer, the second network function is a network function (NF) repository function (NRF), and the third network function is a user plane function (UPF).

5. The apparatus of claim 1, wherein the first request includes a traffic descriptor of the route selection policy rule.

6. The apparatus of claim 1, wherein the first request identifies the at least one wireless communication device as any wireless communication device that establishes a data session according to the route selection policy rule.

7. A method for wireless communication by an apparatus, the method comprising:
- receiving a first request from a first network function, the first request identifying at least one wireless communication device, and a first list of allowed traffic to a user plane connection with network resources established corresponding to a route selection policy rule, wherein the request includes an indication to identify at least one wireless communication device that routes traffic via the established user plane connection that is not included in the first list of allowed traffic;

sending a second request to a second network function to be notified when the at least one wireless communication device establishes a user plane connection to network resources defined in the route selection policy rule;

determining at least one third network function with which the at least one wireless communication device has established a user plane connection according to network resources defined in the route selection policy rule;

sending a third request to the at least one third network function to report, for each of the at least one wireless communication devices, traffic sent via the user plane connection that is not included in the first list of allowed traffic;

receiving from the third network function, a report indicating, for any of the at least one wireless communication device that route traffic that is not included in the first list of allowed traffic, the traffic sent via the user plane connection that is not included in the first list of allowed traffic.

8. The method of claim 7, wherein the first request includes a traffic descriptor of the route selection policy rule.

9. The method of claim 8, wherein the first request identifies the at least one wireless communication device as any wireless communication device that establishes a data session according to the route selection policy rule.

10. The method of claim 7, wherein the apparatus implements a network function (NF), the second network function is a session management function (SMF) and the third network function is a user plane function (UPF).

11. The method of claim 7, wherein the apparatus implements a network data analytics function (NWDAF), the second network function is a user data management (UDM), and the third network function is a user plane function (UPF).

12. The method of claim 7, wherein the apparatus implements a network data analytics function (NWDAF), the first network function is a consumer, the second network function is a network function (NF) repository function (NRF), and the third network function is a user plane function (UPF).

13. An apparatus for wireless communication, the apparatus comprising:

at least one memory; and at least one processor coupled with the at least one memory and configured to cause the apparatus to:

receive a request for the apparatus to report, for each of at least one wireless communication device, traffic sent via a user plane connection that is not included in a first list of allowed traffic; and send a report, the report indicating that for any of the at least one wireless communication devices, traffic is sent via the user plane connection that is not included in the first list of allowed traffic.

14. The apparatus of claim 13, wherein the at least one processor is further configured to cause the apparatus to receive the request from a network function (NF), send the report to the NE, and wherein the apparatus implements a user plane function (UPF).

15. The apparatus of claim 13, wherein the at least one processor is further configured to cause the apparatus to receive the request from a network data analytics function (NWDAF) and wherein the apparatus implements a user plane function (UPF).

16. The apparatus of claim 13, wherein the request includes a traffic descriptor of a route selection policy rule.

17. The apparatus of claim 16, wherein a route selection policy rule defines a type of traffic, and a set of service data flows, that are allowed in respect of the type of traffic.

18. A method for wireless communication by an apparatus, the method comprising:

receiving a request for the apparatus to report, for each of at least one wireless communication device, traffic sent via a user plane connection that is not included in a first list of allowed traffic; and sending a report, the report indicating that for any of the at least one wireless communication devices, traffic is sent via the user plane connection that is not included in the first list of allowed traffic.

19. The method of claim 18, wherein the request includes a traffic descriptor of a route selection policy rule.

20. The method of claim 19, wherein the route selection policy rule defines a type of traffic, and a set of service data flows, that are allowed in respect of the type of traffic.

* * * * *